United States Patent
Nakanishi et al.

(10) Patent No.: US 8,999,465 B2
(45) Date of Patent: Apr. 7, 2015

(54) LIQUID CRYSTAL DISPLAY DEVICE

(75) Inventors: Youhei Nakanishi, Osaka (JP); Takeshi Noma, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 110 days.

(21) Appl. No.: 13/877,974

(22) PCT Filed: Sep. 29, 2011

(86) PCT No.: PCT/JP2011/072308
§ 371 (c)(1),
(2), (4) Date: Apr. 5, 2013

(87) PCT Pub. No.: WO2012/046608
PCT Pub. Date: Apr. 12, 2012

(65) Prior Publication Data
US 2013/0188119 A1    Jul. 25, 2013

(30) Foreign Application Priority Data

Oct. 7, 2010 (JP) ................. 2010-227892

(51) Int. Cl.
*G02F 1/1337* (2006.01)
*G02F 1/1343* (2006.01)
(Continued)

(52) U.S. Cl.
CPC ........ *G02F 1/1337* (2013.01); *G02F 1/133711* (2013.01); *G02F 1/133707* (2013.01); *G02F 2001/133715* (2013.01); *G02F 1/1343* (2013.01)

(58) Field of Classification Search
CPC ................. C09K 2019/0448; C09K 2019/122; G02F 1/1343; G02F 1/133711; G02F 2001/133726
USPC ................. 428/1.1, 1.5; 252/299.01, 299.5; 349/123, 124
See application file for complete search history.

(56) References Cited

U.S. PATENT DOCUMENTS

2003/0143343 A1* 7/2003 Kawabata et al. ............. 428/1.1
2003/0213272 A1   11/2003 Lamprecht et al.
(Continued)

FOREIGN PATENT DOCUMENTS

CN    101293944        10/2008
CN    101293944 A      10/2008
(Continued)

OTHER PUBLICATIONS

International Search Report for PCT/JP2011/072308, mailed Nov. 1, 2011.

*Primary Examiner* — Shean C Wu
(74) *Attorney, Agent, or Firm* — Nixon & Vanderhye P.C.

(57) ABSTRACT

The present invention provides a liquid crystal display device in which display defects are not easily generated even when an alignment film is not formed. The liquid crystal display device of the present invention includes a pair of substrates; and a liquid crystal layer that is held between the pair of substrates, wherein both substrates of the pair of substrates do not substantially include an alignment film, at least one substrate of the pair of substrates includes a polymer layer that controls the alignment of liquid crystal molecules adjacent thereto, the polymer layer is formed by polymerization of monomers of at least one kind included in a liquid crystal layer composition, and the monomers of at least one kind contain a compound represented by the following formula (1):

[Chem. 1]

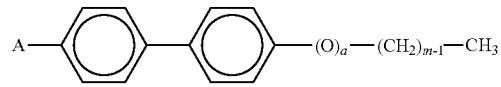

(1)

(wherein A represents an acrylate group, a methacrylate group, an ethacrylate group, a vinyl group, or an allyl group; a represents 0 or 1; and m represents a natural number of 4 to 12).

6 Claims, 11 Drawing Sheets

(51) Int. Cl.
*C09K 19/38* (2006.01)
*C09K 19/54* (2006.01)

(56) References Cited

U.S. PATENT DOCUMENTS

| | | |
|---|---|---|
| 2004/0188653 A1 | 9/2004 | Kataoka et al. |
| 2005/0012070 A1 | 1/2005 | Inoue et al. |
| 2005/0109985 A1 | 5/2005 | Kataoka et al. |
| 2005/0136196 A1 | 6/2005 | Kataoka et al. |
| 2005/0264737 A1 | 12/2005 | Kataoka et al. |
| 2006/0066793 A1 | 3/2006 | Ohmuro et al. |
| 2006/0209240 A1 | 9/2006 | Kataoka |
| 2007/0206129 A1 | 9/2007 | Nakamura et al. |
| 2009/0086139 A1* | 4/2009 | Pai et al. .......... 349/123 |
| 2009/0269515 A1 | 10/2009 | Kataoka |
| 2010/0221456 A1 | 9/2010 | Kataoka et al. |
| 2012/0008079 A1* | 1/2012 | Mizusaki et al. ......... 349/124 |
| 2012/0050631 A1 | 3/2012 | Ohmuro et al. |
| 2012/0099064 A1* | 4/2012 | Nakai et al. ............ 349/123 |
| 2012/0113370 A1* | 5/2012 | Nakai et al. ............ 349/123 |
| 2012/0177847 A1 | 7/2012 | Nakamura et al. |
| 2012/0219729 A1 | 8/2012 | Kataoka et al. |
| 2013/0020023 A1* | 1/2013 | Kubota et al. ............ 156/275.5 |
| 2014/0002782 A1* | 1/2014 | Nakanishi et al. ........... 349/123 |

FOREIGN PATENT DOCUMENTS

| | | |
|---|---|---|
| JP | 2004-004329 | 1/2004 |
| JP | 2004-184846 | 7/2004 |
| JP | 2004-294648 | 10/2004 |
| JP | 2004-302061 | 10/2004 |
| JP | 2005-181582 | 7/2005 |
| JP | 2005-338613 | 12/2005 |
| JP | 2006-091545 | 4/2006 |
| JP | 2006-145992 | 6/2006 |
| JP | 2007-261952 | 10/2007 |
| JP | 2007-261952 A | 10/2007 |
| TW | 438877 | 6/2001 |
| TW | 438877 B | 6/2001 |
| WO | WO 2009/054545 | 4/2009 |
| WO | WO 2009/054545 A1 | 4/2009 |
| WO | WO 2010/047260 | 4/2010 |
| WO | WO 2010/047260 A1 | 4/2010 |

\* cited by examiner

About 0.1mm

LIQUID CRYSTAL DISPLAY DEVICE

This application is the U.S. national phase of International Application No. PCT/JP2011/072308 filed 29 Sep. 2011 which designated the U.S. and claims priority to JP Patent Application No. 2010-227892 filed 7 Oct. 2010, the entire contents of each of which are hereby incorporated by reference.

TECHNICAL FIELD

The present invention relates to a liquid crystal display device. More specifically, the present invention relates to a liquid crystal display device that controls the alignment of liquid crystal molecules by using a polymer layer, which is formed by polymerization of monomers included in a liquid crystal layer composition, without an existing alignment film being formed.

BACKGROUND ART

A liquid crystal display device is widely used as a display device of a television, a personal computer, a PDA, or the like due to its thin thickness, light weight, and low power consumption. In particular, recently, the size of a liquid crystal display device has been rapidly increased as represented by a liquid crystal display device for a television. In order to increase the size, the multi-domain vertical alignment (MVA) mode is preferably used in which even a large-sized device having a wide viewing angle can be manufactured at a high yield. In the MVA mode, at the time a voltage is not applied to a liquid crystal layer, liquid crystal molecules are aligned perpendicular to a substrate surface. Therefore, a higher contrast ratio can be obtained than that of the twisted nematic (TN) mode of the related art.

In the MVA mode, the tilt direction of liquid crystal molecules is not regulated by an alignment film but is determined by the influence of a protrusion (rib) formed of an insulating material. Therefore, an alignment treatment for an alignment film is not necessary, and static electricity and dust caused by rubbing are not generated. Accordingly, a washing process and the like after the alignment treatment are not necessary. In addition, there is little variation in the initial tilt of liquid crystal molecules, which is effective for process simplification, yield improvement, and cost reduction.

However, in the MVA mode, although the alignment treatment is not necessary, it is necessary that an undercoat film corresponding to the alignment film be formed. Therefore, it is necessary to deal with the influence of the thickness non-uniformity of the undercoat film and the mixing of foreign materials on the alignment of liquid crystal molecules, and the production process and investment in plant and equipment are increased to form the undercoat film. In consideration of such circumstances, it is more preferable that the undercoat film be not provided.

On the other hand, recently, pre-tilt angle imparting techniques have attracted attention in which polymer components such as monomers and oligomers (hereinafter, abbreviated as "monomers and the like") are mixed with liquid crystal to obtain a liquid crystal layer composition; the liquid crystal layer composition is sealed between substrates; and the monomers and the like are polymerized to form a polymer layer in a state where liquid crystal molecules are tilted by applying a voltage between the substrates (for example, refer to Patent Literatures 1 to 8). Due to the influence of such a polymer layer, the liquid crystal molecules have a predetermined pre-tilt angle after the voltage application is stopped. Therefore, the tilt direction of the liquid crystal molecules is maintained without an alignment film. Such monomers and the like are polymerized by heat or irradiation of light (for example, ultraviolet rays).

CITATION LIST

Patent Literature

Patent Literature 1: JP-A-2004-184846
Patent Literature 2: JP-A-2004-4329
Patent Literature 3: JP-A-2004-294648
Patent Literature 4: JP-A-2004-302061
Patent Literature 5: JP-A-2005-181582
Patent Literature 6: JP-A-2005-338613
Patent Literature 7: JP-A-2006-91545
Patent Literature 8: JP-A-2006-145992

SUMMARY OF INVENTION

Technical Problem

However, as a result of investigation, the present inventors found that there are cases where satisfactory display is not obtained depending on used materials and manufacturing conditions even when a liquid crystal layer composition including a liquid crystal material, monomers, and a polymerization initiator is injected into a pair of substrates and polymerization is performed under predetermined conditions to form a polymer layer. Specifically, there are cases where hysteresis is shown in V-T characteristics, alignment defects are generated, and luminous dots and luminous lines are generated in black display.

FIGS. 20 and 21 are schematic diagrams illustrating the black display of a liquid crystal display device which is formed by using a polymer layer-forming technique of the related art. FIG. 20 illustrates an example (first related-art example) in which lauryl acrylate is used as a monomer material, and FIG. 21 illustrates an example (second related-art example) in which compounds represented by formulae in FIG. 10 of Patent Literature 4 (JP-A-2004-302061) are used as monomer materials.

The black display illustrated in FIGS. 20 and 21 is observed by using a polarizing microscope in which polarizing axes intersect with each other at 90° C. without attaching a polarizing plate onto a liquid crystal display panel. As illustrated in FIGS. 20 and 21, in the related-art examples, plural luminous dots and luminous lines are generated and display defects are generated in the black display. In particular, in the first related-art example, a large number of luminous dots and luminous lines are generated.

The present invention has been made in consideration of such circumstances, and an object thereof is to provide a liquid crystal display device in which display defects are not easily generated even when an alignment film is not formed.

Solution to Problem

The present inventors investigated various methods capable of obtaining satisfactory display without an alignment film being formed; and focused on the kinds of monomers which are added to a liquid crystal layer composition.

[Chem. 1]

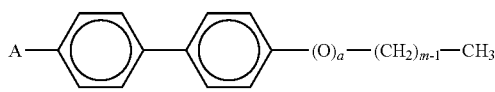
(1)

The present inventors found that, when a compound represented by the above formula (1) is used as a monomer, satisfactory black display in which a small number of luminous lines are generated can be obtained.

The compound represented by the formula (1) includes a structure in which a biphenyl group is directly bonded to a functional group. Two benzene rings are bonded to each other at the 1 position and the 1' position, respectively, and include a linear structure. In addition, since the functional group is directly bonded to the benzene rings, the compound has a structure in which a portion from the functional group positioned at a terminal to biphenyl is not bent. Therefore, the stable linear structure can be obtained.

The monomer used in the first related-art example is a lauryl acrylate monomer represented by the following formula (2).

[Chem. 2]

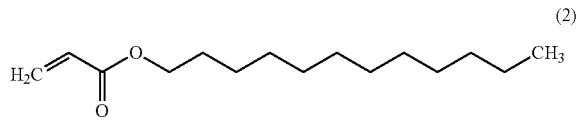
(2)

As illustrated in FIG. 20, when lauryl acrylate is used as a monomer, a large number of luminous lines are generated. This indicates that, unless an alignment film is formed, the vertical alignment of liquid crystal molecules is not sufficiently obtained in a polymer layer obtained from the lauryl acrylate monomer.

The monomers used in the second related-art example are biphenyl monomers represented by the following formulae (3-1) to (3-4).

[Chem. 3]

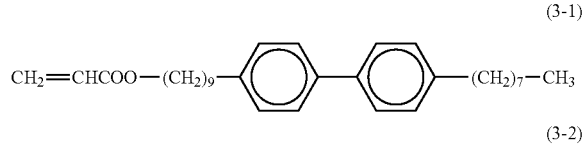
(3-1)

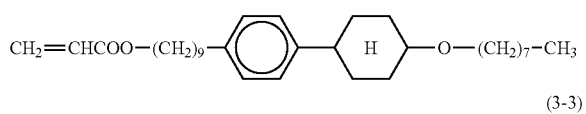
(3-2)

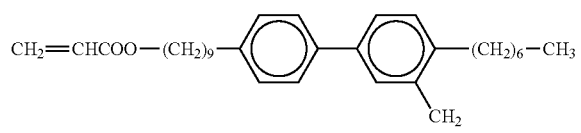
(3-3)

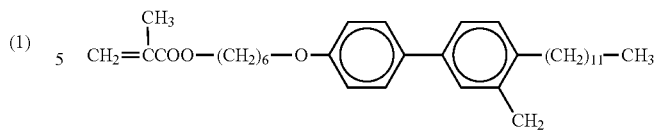
(3-4)

As illustrated in FIG. 19, the number of luminous lines is reduced compared to the case of using the lauryl acrylate monomer, but there are still luminous lines. This indicates that, unless an alignment film is formed, the vertical alignment of liquid crystal molecules is not sufficiently obtained in a polymer layer obtained from the biphenyl monomers represented by the formulae (3-1) to (3-4).

More specifically, all of the biphenyl monomers represented by the formulae (3-1) to (3-4) include a specific repeating unit between a biphenyl group and a functional group. The present inventors found that, when there is such a structure, the structural degree of freedom between a benzene ring and a functional group is high; and as a result, the alignment is unstable and line defects are generated and appear as luminous lines.

Therefore, the present inventors thoroughly investigated and found that a more linear structure is obtained and the vertical alignment of liquid crystal molecules is improved by using, as a monomer for forming a polymer layer, a monomer including a structure in which a biphenyl group is directly bonded to a functional group; and the functional group is directly bonded to the 4 position or 4' position of the biphenyl group. The principle of obtaining satisfactory vertical alignment by using a monomer including a linear structure is as follows.

As in the case of lauryl acrylate, the vertical alignment can be realized even in a structure not including a benzene ring. This is because an alkyl chain extends in a direction perpendicular to a substrate surface and the major axis of liquid crystal molecules faces the same direction as that of the alkyl chain. However, when a side chain includes a biphenyl structure, the major axis of liquid crystal molecules is likely to face a linking direction of the biphenyl structure. This is because, generally, liquid crystal molecules include a similar structure to the biphenyl structure. Therefore, when the side chain has a biphenyl structure, the vertical alignment is further improved.

FIGS. 22 and 23 are schematic diagrams illustrating the relationship between a side chain of a polymer layer and the alignment of liquid crystal molecules. FIG. 22 illustrates a structure of a polymer layer which is formed by using a monomer in which a functional group is bonded to the 4 position and an alkyl chain is bonded to the 4' position, and FIG. 23 illustrates a structure of a polymer layer which is formed by using a monomer in which a functional group is bonded to the 3 position and an alkyl chain is bonded to the 4' position.

As illustrated in FIG. 22, when a polymer layer is formed on a substrate 1 by using a monomer which includes an alkyl group or alkoxy group, and a functional group at the 4-4' position of biphenyl, the alkyl chain or alkoxyl chain contained in a side chain 2 of the polymer extends in a direction perpendicular to a surface of the substrate 1. In addition, the functional groups are bonded to each other to form a main chain of the polymer on the surface of the substrate 1 and thus have a perpendicular positional relationship to biphenyl. As a result, the major axis of liquid crystal molecules 3 faces the same direction as a lengthwise direction of the alkyl chain or alkoxyl chain. In this way, due to the action of the polymer layer, the vertical alignment of the liquid crystal molecules 3 is realized without an alignment film being formed.

On the other hand, as illustrated in FIG. 23, when a polymer layer is formed on the substrate 1 by using a monomer which includes an alkyl group or alkoxy group, and a functional group at the 3-4' position of biphenyl, the alkyl chain or alkoxyl chain contained in the side chain 2 of the polymer does not extend in a direction perpendicular to the surface of the substrate 1. As a result, the major axis of the liquid crystal molecules 3 faces a direction tilted to the surface of the substrate 1 along the lengthwise direction of the alkyl chain or alkoxyl chain. As a result, the vertical alignment of the liquid crystal molecules 3 is not realized.

In this way, the present inventors could solve the above-described problems, thereby completing the present invention.

That is, the present invention is a liquid crystal display device including: a pair of substrates; and a liquid crystal layer that is held between the pair of substrates, wherein both substrates of the pair of substrates do not substantially include an alignment film, at least one substrate of the pair of substrates includes a polymer layer that controls the alignment of liquid crystal molecules adjacent thereto, the polymer layer is formed by polymerization of monomers of at least one kind included in a liquid crystal layer composition, and the monomers of at least one kind contain a compound represented by the following formula (1):

[Chem. 4]

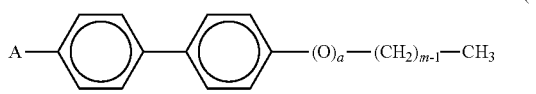

(1)

(wherein A represents an acrylate group, a methacrylate group, an ethacrylate group, a vinyl group, or an allyl group; a represents 0 or 1; and m represents a natural number of 4 to 12).

Hereinafter, the liquid crystal display device according to the present invention will be described in detail.

The pair of substrates included in the liquid crystal display device according to the present invention is substrates between which a liquid crystal layer is held; and is manufactured by, for example, forming a wiring, an electrode, a color filter, and the like on an insulating substrate formed of glass, resin, or the like.

In the present invention, both substrates of the pair of substrates do not substantially include an alignment film. In a general liquid crystal display device, an alignment film is formed by direct coating (for example, coating of polyimide, polyamic acid or the like) or evaporation (for example, oblique evaporation of silicon (Si)) of an alignment film material on a substrate surface including a display region. The display region is a region on which an image recognized by an observer is displayed, and does not include, for example, a peripheral region such as terminals. The alignment film is not necessarily subjected to an alignment treatment as long as it is coated with a so-called general alignment film material such as polyimide or polyamic acid. Examples of the alignment treatment include a rubbing treatment and an optical alignment treatment. When an alignment control structure is provided, for example, as in the case of the MVA mode or PVA mode described below, the tilt of liquid crystal molecules can be controlled without such an alignment treatment. In this specification, "not substantially including an alignment film" refers to such an existing alignment film being not formed.

FIG. 24 is a flowchart illustrating an example of manufacturing processes of a general liquid crystal display device. On the other hand, FIG. 25 is a flowchart illustrating an example of manufacturing processes of a liquid crystal display device according to the present invention. As illustrated in FIG. 24, in the related art, after washing a substrate, the substrate is coated with an alignment film material. Then, after burning the substrate coated with the alignment film, a bonding process such as seal printing is performed. On the other hand, in the present invention, as illustrated in FIG. 25, after washing a substrate, the process proceeds to a seal printing process without passing through an alignment film forming process. In addition, in the related art, after bonding substrates, the process proceeds to a polarizing plate attaching process. However, in the present invention, after bonding substrates, a polymerization process for forming a polymer layer, for example, such as an exposure process is performed. Examples of a seal printing method include a method of coating a substrate with a material and then curing the sealing material through ultraviolet ray exposure and/or with heat. In addition, examples of a filing method of liquid crystal include a one drop filling method and a vacuum injection method. In the case of the vacuum injection method, the vacuum injection of liquid crystal is performed after burning a seal. In addition, examples of maintaining the thickness of a liquid crystal layer include a method using a spacer such as a method of patterning a columnar photospacer and a method of spraying a spherical spacer.

At least one substrate of the pair of substrates includes a polymer layer that controls the alignment of liquid crystal molecules adjacent thereto, the polymer layer is formed by polymerization of monomers of at least one kind included in a liquid crystal layer composition, and the monomers of at least one kind contain a compound represented by the above formula (1). By setting the number of carbon atoms of an alkyl chain in a range of 4 to 12, a monomer material having a high solubility in a liquid crystal material is obtained.

The polymer layer according to the present invention may further include a compound other than the compound represented by the above formula (1) as a monomer. It is preferable that the monomers of at least one kind contain a bifunctional monomer; and a molar ratio of the bifunctional monomer to the compound represented by the above formula (1) is less than or equal to 0.1. In addition, the liquid crystal layer composition may contain a polymerization initiator.

The polymer layer according to the present invention is formed by using a monomer in which an alkyl group or alkoxy group, and a functional group are bonded to the 4-4' position of a biphenyl group. In addition, the functional group and the biphenyl group are directly bonded to each other. Therefore, liquid crystal molecules adjacent thereto can be aligned in a direction perpendicular to the surface of the polymer layer with a high alignment regulating force.

In addition, the polymer layer according to the present invention is formed by using a monomer including a biphenyl group. Therefore, liquid crystal molecules adjacent thereto can be aligned with a high alignment regulating force such that the major axis thereof is aligned in a direction along a side chain of the polymer.

Furthermore, the polymer layer according to the present invention is formed by using a monomer including a linear structure from a biphenyl group to a terminal of an alkyl chain. Therefore, liquid crystal molecules adjacent thereto can be aligned with a stable alignment regulating force.

In this way, the polymer layer which imparts a high vertical alignment regulating force is formed on a surface in contact with the liquid crystal layer. As a result, a liquid crystal display device, which has a small number of luminous points and luminous lines and satisfactory display quality, can be obtained.

The configuration of the liquid crystal display device of the present invention is not especially limited by other components as long as it essentially includes such components.

As a preferable form of the liquid crystal display device according to the present invention, for example, a form may be adopted in which both substrates of the pair of substrates include an electrode; one substrate of the pair of substrates includes a wall-shaped dielectric protrusion on a liquid crystal layer side of the electrode; and the electrode included in the other substrate of the pair of substrates includes a slit. By providing such a dielectric protrusion and such a slit, the polymer layer can be stably formed.

As a preferable form of the liquid crystal display device according to the present invention, for example, a form may be adopted in which both substrates of the pair of substrates include an electrode and all the electrodes include a slit. By providing such a slit, the polymer layer can be stably formed.

As a preferable form of the liquid crystal display device according to the present invention, for example, a form may be adopted in which both substrates of the pair of substrates include an electrode; and one substrate of the pair of substrates includes a columnar dielectric protrusion on a liquid crystal layer side of the electrode. By providing such a dielectric protrusion, the polymer layer can be stably formed.

Advantageous Effects of Invention

According to a liquid crystal display device of the present invention, even when an alignment film is not formed, a polymer layer having a high vertical alignment regulating force on liquid crystal molecules can be formed. Accordingly, luminous dots and luminous lines in black display can be suppressed and thus satisfactory display quality is obtained.

DESCRIPTION OF EMBODIMENTS

Figure 1:
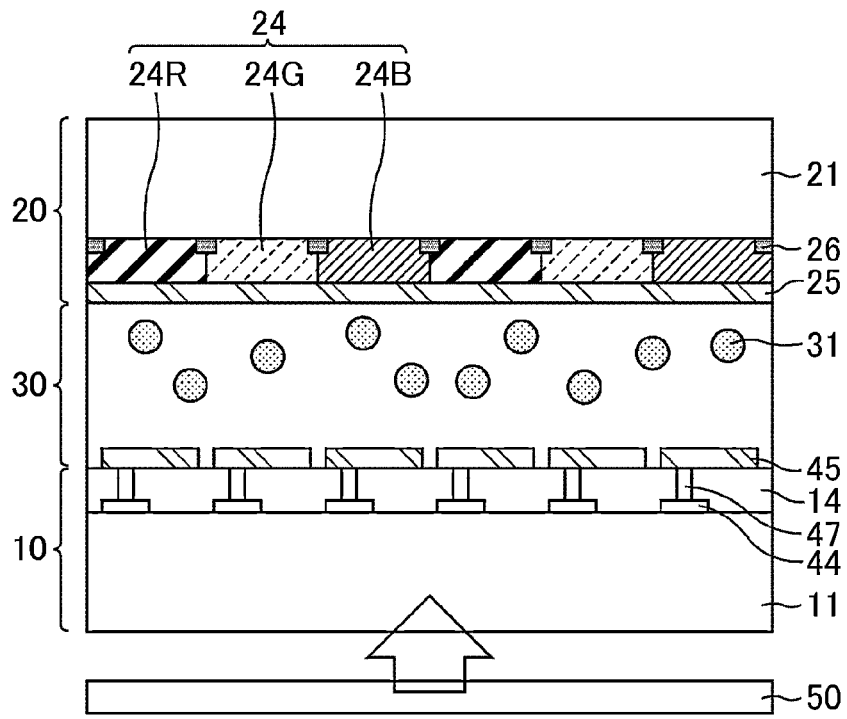
FIG. 1 is a cross-sectional view schematically illustrating a liquid crystal display device according to Embodiment 1 before a monomer polymerization process.

The present invention will be mentioned in more detail referring to the drawings in the following embodiments, but is not limited to these embodiments.

Embodiment 1

Figure 2:
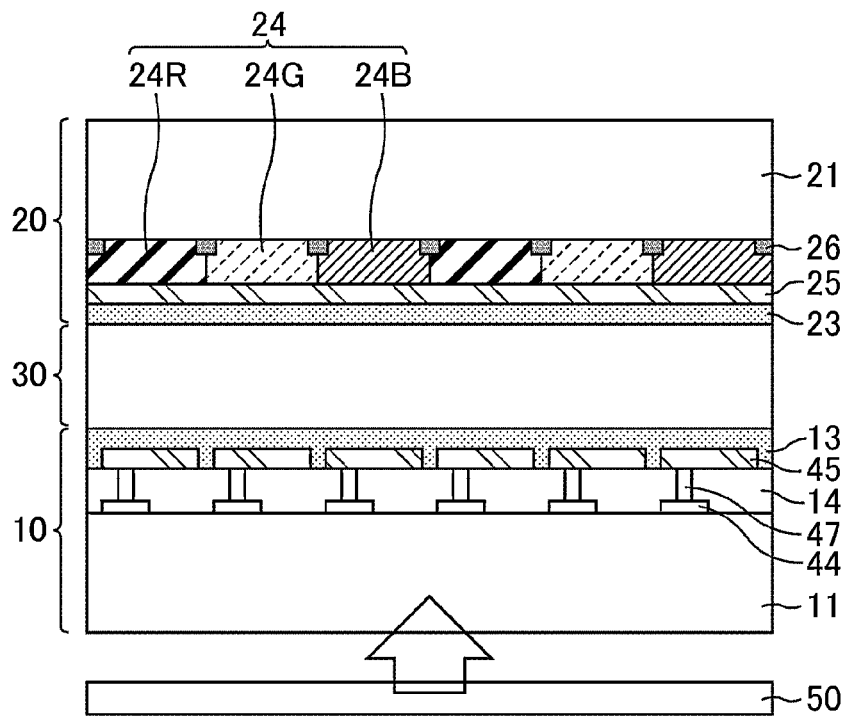
FIG. 2 is a cross-sectional view schematically illustrating a liquid crystal display device according to Embodiment 1 after a monomer polymerization process.

FIGS. 1 and 2 are cross-sectional views schematically illustrating a liquid crystal display device according to Embodiment 1. FIG. 1 illustrates the liquid crystal display device before a monomer polymerization process, and FIG. 2 illustrates the liquid crystal display device after the monomer polymerization process. As illustrated in FIGS. 1 and 2, the liquid crystal display device according to Embodiment 1 includes a liquid crystal display panel that includes an array substrate 10, a counter substrate 20, and a liquid crystal layer 30 that is held between a pair of substrates including the array substrate 10 and the counter substrate 20. In addition, a back light unit 50 is provided on the backside of the liquid crystal display panel. The liquid crystal display device according to Embodiment 1 is a transmission type liquid crystal display device which performs display by using light emitted from the back light unit 50. As a modification example of the liquid crystal display device according to Embodiment 1, for example, a reflection type liquid crystal display device may be adopted in which outside light is used as display light without providing the back light unit 50. With this method, liquid crystal display can be sufficiently performed.

The array substrate 10 includes an insulating transparent substrate 11 that is formed of glass or the like; and conductive members that are formed on the transparent substrate 11 such as wirings, pixel electrodes 45, thin film transistors (TFTs) 44, and contact portions 47 connecting the TFTs 44 to the pixel electrodes 45. The liquid crystal display device according to Embodiment 1 does not substantially include an alignment film on the pixel electrodes 45. In other words, the pixel electrodes 45 are in direct contact with the liquid crystal layer 30. An insulating film 14 is formed between the TFTs 44 and the pixel electrodes 45.

The counter substrate 20 includes an insulating transparent substrate 21 that is formed of glass or the like, color filters 24, black matrixes 26, and a common electrode 25. The liquid crystal display device according to Embodiment 1 does not substantially include an alignment film on the common electrode 25. In other words, the common electrode 25 is in direct contact with the liquid crystal layer 30. In FIGS. 1 and 2, three color filters including a red filter 24R, a green filter 24G, and a blue filter 24B are used. However, the kind, number, and arrangement order of color filters are not particularly limited as long as at least these three color filters are included.

The liquid crystal layer 30 is filled with a liquid crystal material. The kind of the liquid crystal material is not particularly limited, either a material having negative dielectric anisotropy or a material having positive dielectric anisotropy can be used and be appropriately selected according to the display mode of liquid crystal. In Embodiment 1, as described below, a polymer layer having superior properties of aligning the initial tilt of liquid crystal molecules in a direction perpendicular to a substrate surface is obtained. For example, by using a liquid crystal material having negative dielectric anisotropy, a form of a satisfactory vertical alignment (VA) mode can be obtained.

As illustrated in FIG. 1, there are monomers of at least one kind 31 in the liquid crystal layer 30 before the polymerization process. Then, through the polymerization process, the polymerization of the monomer 31 starts, and polymer layers 13 and 23 are directly formed on the pixel electrodes 45 and the common electrode 25 as illustrated in FIG. 2.

Specifically, the polymer layers 13 and 23 can be formed by injecting a liquid crystal layer composition containing the monomers of at least one kind 31 and a liquid crystal material into a gap between the array substrate 10 and the counter substrate 20 to form the liquid crystal layer 30; and irradiating the liquid crystal layer 30 with a given amount of light to photopolymerize the monomer 31. The polymerization of the monomer 31 starts due to the influence of active species which are generated, for example, when a polymerization initiator is irradiated with light. In addition, in FIG. 2, the polymer layers 13 and 23 are formed on a single surface, but may be formed from plural points in practice; and the thickness may be nonuniform.

At least one of monomers used in Embodiment 1 is a compound represented by the following formula (1).

[Chem. 5]

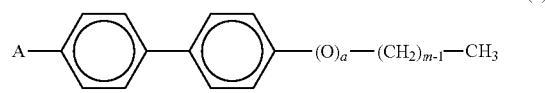

(1)

(In the formula A represents an acrylate group, a methacrylate group, an ethacrylate group, a vinyl group, or an allyl group; a represents 0 or 1; and m represents a natural number of 4 to 12)

In the compound represented by the above formula (1), an alkyl group or alkoxy group, or a functional group is bonded to the 4-4' position of biphenyl. In addition, the functional group and the biphenyl group are directly bonded to each other. Therefore, the polymer layer that aligns liquid crystal molecules in a direction perpendicular to the surface of the polymer layer with a high alignment regulating force can be formed.

In addition, the compound represented by the above formula (1) includes a biphenyl group. Therefore, the polymer layer that aligns liquid crystal molecules with a high alignment regulating force such that the major axis thereof is aligned in a direction along a side chain of the polymer can be formed.

Furthermore, the compound represented by the above formula (1) includes a linear structure from the biphenyl group to a terminal of the alkyl chain. Therefore, the polymer layer that aligns liquid crystal molecules with a stable alignment regulating force can be formed.

The monomer in Embodiment 1 may further include other monomer as long as it includes the monomer represented by the above formula (1). It is preferable that the other monomer be a bifunctional monomer. It is more preferable that a molar ratio of the other monomer to the compound represented by the above formula (1) is less than or equal to 0.1.

Examples of the bifunctional monomer include compounds represented by the following formula (4) and compounds represented by the following formula (5).

[Chem. 6]

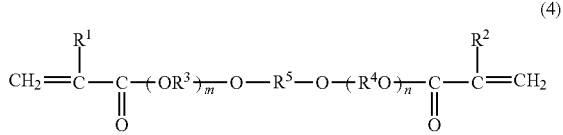

(4)

($R^1$ and $R^2$ may be the same or different from each other and each independently represent a hydrogen atom or an alkyl group having 1 or 2 carbon atoms; $R^3$ and $R^4$ may be the same or different from each other and each independently represent an alkylene group having 2 to 4 carbon atoms; $R^5$ represents a linear or branched aliphatic hydrocarbon group, an aromatic hydrocarbon group, or an alicyclic hydrocarbon group; and m and n represent an integer of 0 to 4)

[Chem. 7]

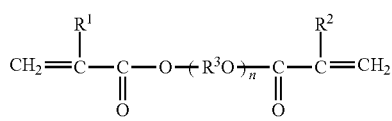

(5)

($R^1$ and $R^2$ may be the same as or different from each other and each independently represent a hydrogen atom or an alkyl group having 1 or 2 carbon atoms; $R^3$ represents an alkylene group having 1 to 3 carbon atoms; and n represents an integer of 0 to 12.)

In Embodiment 1, for example, when a monomer polymerization process is performed, by irradiating the liquid crystal layer 30 with light in a state where a threshold or higher voltage is applied thereto, a polymer is formed in a form following liquid crystal molecules which are aligned in the state in which the threshold or higher voltage is applied. Therefore, the formed polymer layers 13 and 23 include a structure of functioning as a polymer layer that regulates the initial pre-tilt angle of liquid crystal molecules even in a state where a voltage is not applied thereafter.

However, in Embodiment 1, before forming the polymer layer, the tilt direction of liquid crystal molecules in the state where a voltage is applied to the liquid crystal layer 30 is not determined. Therefore, the alignment of liquid crystal molecules is not uniform and a time is taken until the alignment becomes stable, which may cause display defects. On the other hand, in Embodiment 1, an alignment control structure is provided in which liquid crystal molecules can be tilted to a substrate surface in a given direction when a voltage is not applied and/or when a voltage is applied. As a result, the possibility of display defects can be reduced. Hereinafter, the description will be made by using examples.

Application Example 1

Examples of the alignment control structure include a wall-shaped dielectric protrusion that is provided on an electrode and protrudes toward the liquid crystal layer; and a slit that is provided on an electrode. Such a dielectric protrusion and a slit can be formed by using a photolithography method. Examples of a material of the dielectric protrusion include a photosensitive acrylic resin. Such a wall-shaped (a linear shape in a plan view) dielectric protrusion is also referred to as a rib. In addition, a mode in which the rib and the slit are provided as the alignment control protrusion to control the alignment of liquid crystal molecules is also referred to as the multi-domain vertical alignment (MVA) mode.

Figure 3:
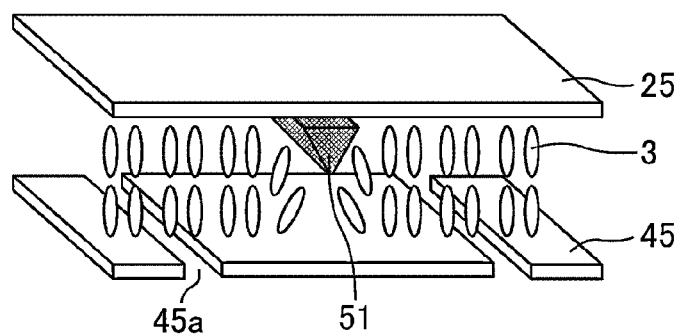
FIG. 3 is a perspective view schematically illustrating an example in which the MVA mode is applied to a liquid crystal display device according to Embodiment 1 when a voltage is not applied thereto.
Figure 4:
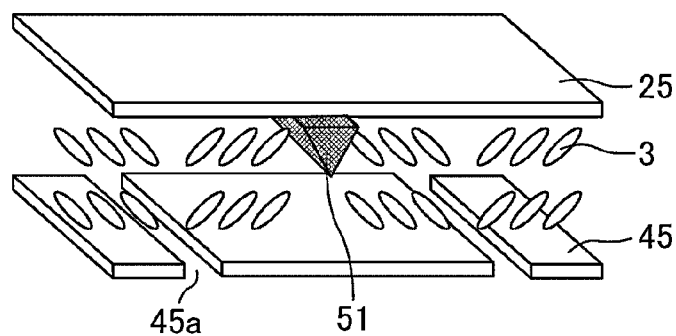
FIG. 4 is a perspective view schematically illustrating an example in which the MVA mode is applied to a liquid crystal display device according to Embodiment 1 when a voltage is applied thereto.

FIGS. 3 and 4 are perspective views schematically illustrating an example in which the MVA mode is applied to a liquid crystal display device according to Embodiment 1. FIG. 3 illustrates a case where a voltage is not applied, and FIG. 4 illustrates a case where a voltage is applied. In the MVA mode, regarding one substrate, a dielectric rib 51 is formed on an electrode; and regarding the other substrate, a slit 45a is formed on the electrode 45. As illustrated in FIG. 3, when a voltage is not applied, almost all the liquid crystal molecules 3 other than a part of the liquid crystal molecules 3 adjacent to the rib 51 are vertically aligned. However, as illustrated in FIG. 4, when a voltage is applied, the liquid crystal molecules 3 are tilted in a direction diagonal to the rib 51 and the slit 45a.

Figure 5:
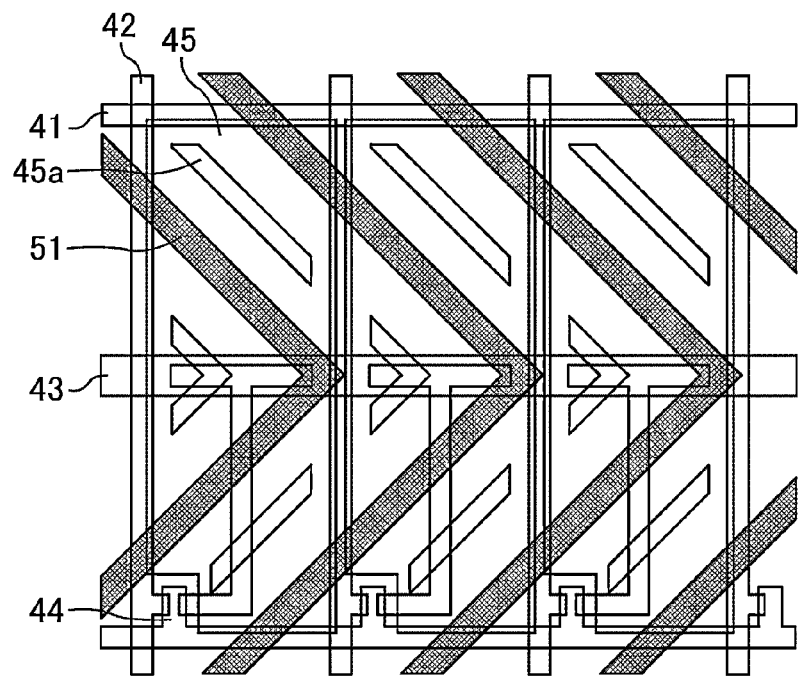
FIG. 5 is a plan view schematically illustrating an example in which the MVA mode is applied to a liquid crystal display device according to Embodiment 1.

FIG. 5 is a plan view schematically illustrating an example in which the MVA mode is applied to a liquid crystal display device according to Embodiment 1. As illustrated in FIG. 5, when seen in a plan view, the rib 51 and the slit 45a have a linear shape and are arranged at regular intervals. A region in which a part of intervals are different may be present. However, it is preferable that substantially all the alignment control structures 45a and 51 have regular intervals. As a result, satisfactory display having a small amount of display unevenness can be obtained.

In addition, the rib 51 is formed on the common electrode 25, irrespective of the size and shape of each pixel. In addition, a part of the rib 51 includes a bent portion. It is preferable that this part includes a V shape when seen in a plan view. In this case, the rib 51 includes a zigzag shape in terms of the entire substrate. As a result, in each pixel, the liquid crystal molecules 3 adjacent to the rib 51 can be uniformly aligned in four different directions.

As illustrated in FIG. 5, in the liquid crystal display device according to Embodiment 1, the array substrate includes the pixel electrodes 45, and each of the pixel electrodes 45 includes a substantially rectangular shape. When the pixel electrodes 45 are arranged in a matrix shape, one display surface is formed. As illustrated in FIG. 5, "substantially rectangular" represents that a part of a rectangular shape may include a protrusion or a notch.

In addition, the array substrate includes plural gate signal lines 41 that extend parallel to each other, plural source signal lines 42 that extend parallel to each other, and plural auxiliary capacitor (Cs) wirings 43 that extend parallel to each other, through an insulating film, respectively. The gate signal lines 41 and the auxiliary capacitor (Cs) wirings 43 extend parallel to each other and intersect the plural source signal lines 42. In addition, the gate signal lines 41 and the source signal lines 42 are connected to the respective electrodes included in the thin film transistors (TFT) 44. Each of the TFTs 44 is a three-terminal field effect transistor and includes three electrodes of a gate electrode, a source electrode, and a drain electrode in addition to a semiconductor layer. The TFT 44 is a switching element that performs drive control of a pixel. In addition, in Embodiment 1, a multi-drive control may be adopted in which one pixel electrode 45 is divided into plural sub pixel electrodes, each sub pixel electrode is provided with a TFT, and two sub pixel electrodes are controlled by one gate line.

On the other hand, the counter substrate includes light-shielding black matrixes (BM) and color filters through which respective light rays having specific wavelengths pass. The BMs are formed between the color filters, respectively, and have a lattice shape as a whole. The BMs are arranged at positions overlapping the respective wirings and TFTs of the array substrate; and the respective color filters are arranged at positions overlapping each of the pixel electrodes of the array substrate.

Figure 6:
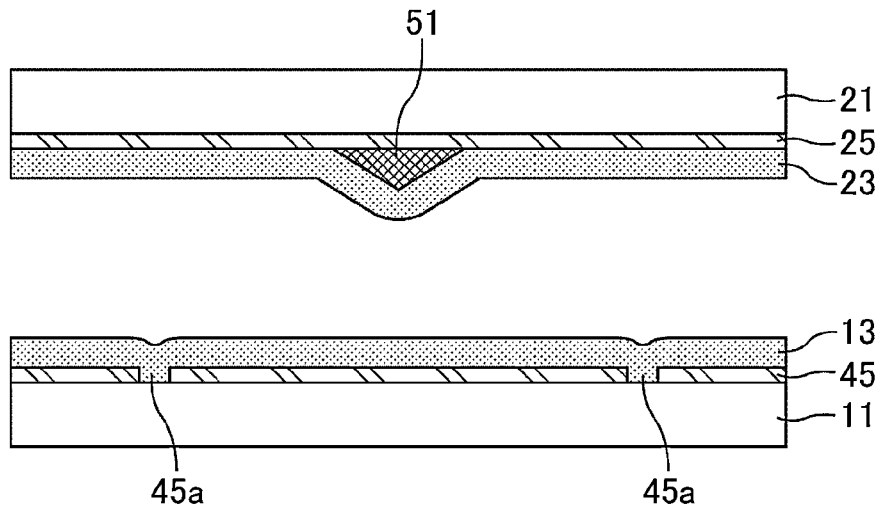
FIG. 6 is a cross-sectional view schematically illustrating an example in which the MVA mode is applied to a liquid crystal display device according to Embodiment 1 after a monomer polymerization process.

FIG. 6 is a cross-sectional view schematically illustrating an example in which the MVA mode is applied to a liquid crystal display device according to Embodiment 1 after a monomer polymerization process. In FIG. 6, the wirings, electrodes, color filters, and the like are not illustrated. As illustrated in FIG. 6, in Application Example 1, the electrodes 25 and 45 are formed on the pair of glass substrates 11 and 21, respectively. Moreover, the polymer layers are formed on the entire surface of the substrate including the electrodes 25 and 45, positions of the electrode 45 exposed by the slit, the rib 51, and the like, thereby forming the interface with the liquid crystal layer. Since the polymer layers 13 and 23 according to Embodiment 1 have a high vertical alignment regulating force, satisfactory black display is obtained and display defects such as luminous dots and luminous lines are not easily generated.

Application Example 2

In Application Example 1, both the rib and the slit are used. However, for example, with a method in which slits are formed on the respective electrodes of both substrates of the pair of substrates, similarly, polymer layers can be formed along the alignment of liquid crystal molecules. In this way, a mode in which electrode slits are formed on both substrates to control the arrangement of liquid crystal molecules is also referred to as the patterned vertical alignment (PVA) mode.

Figure 7:
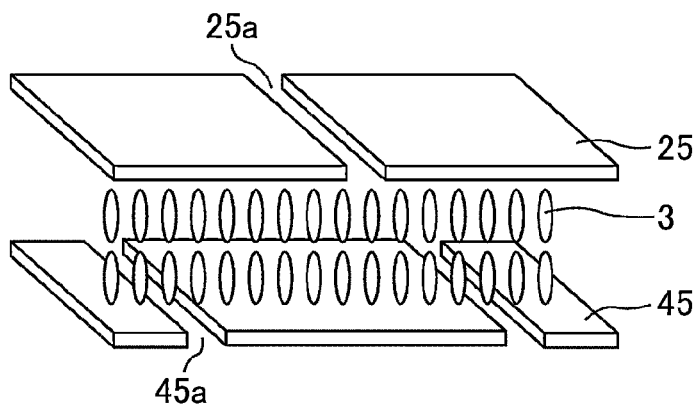
FIG. 7 is a perspective view schematically illustrating an example in which the PVA mode is applied to a liquid crystal display device according to Embodiment 1 when a voltage is not applied thereto.
Figure 8:
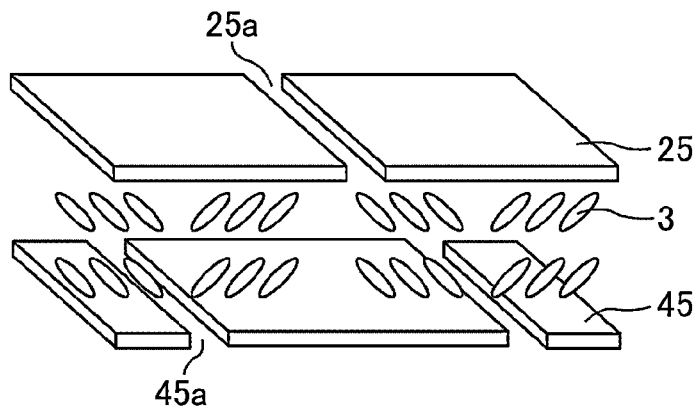
FIG. 8 is a perspective view schematically illustrating an example in which the PVA mode is applied to a liquid crystal display device according to Embodiment 1 when a voltage is applied thereto.

FIGS. 7 and 8 are perspective view schematically illustrating an example in which the PVA mode is applied to a liquid crystal display device according to Embodiment 1. FIG. 7 illustrates a case where a voltage is not applied, and FIG. 8 illustrates a case where a voltage is applied. In the PVA mode, a slit is formed in each electrode of one substrate. As illustrated in FIG. 7, when a voltage is not applied, almost all the liquid crystal molecules 3 are vertically aligned. However, as illustrated in FIG. 8, when a voltage is applied, the liquid crystal molecules 3 are tilted in a direction diagonal to the slits 25a and 45a.

Figure 9:
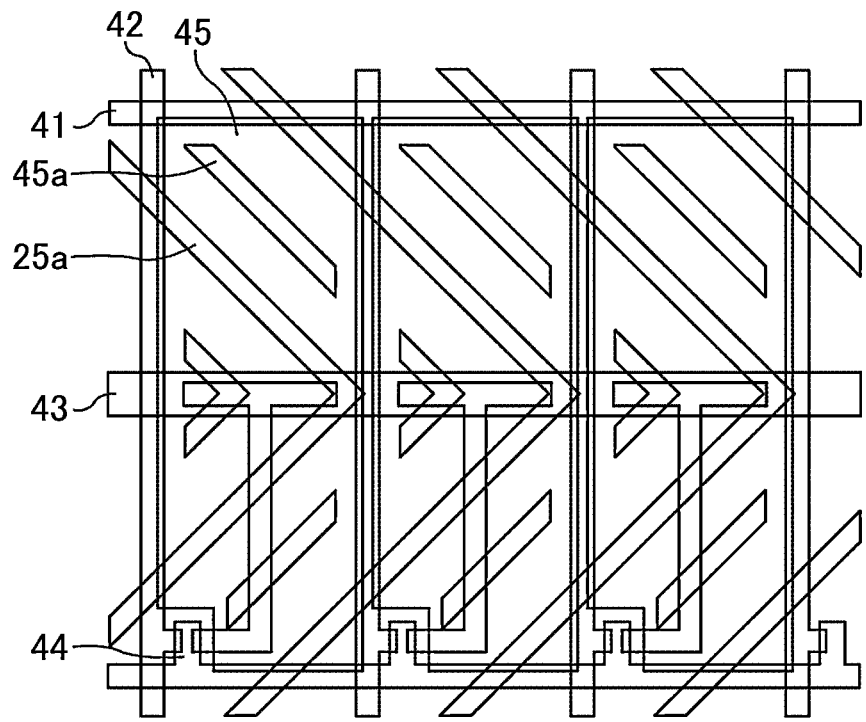
FIG. 9 is a plan view schematically illustrating an example in which the PVA mode is applied to a liquid crystal display device according to Embodiment 1.

FIG. 9 is a plan view schematically illustrating an example in which the PVA mode is applied to a liquid crystal display device according to Embodiment 1. As illustrated in FIG. 9, when seen in a plan view, the respective slits 25a and 45a have a linear shape and are arranged at regular intervals. A region in which a part of intervals are different may be present. However, it is preferable that substantially all the slits 25a and 45a have regular intervals. As a result, satisfactory display having a small amount of display unevenness can be obtained.

In addition, the slit 25a is formed on the common electrode 25, irrespective of the size and shape of each pixel. In addition, a part of the slit 25a includes a bent portion. It is preferable that this part includes a V shape when seen in a plan view. As a result, the liquid crystal molecules 3 adjacent to the slit 25a can be uniformly aligned in four different directions.

Figure 10:
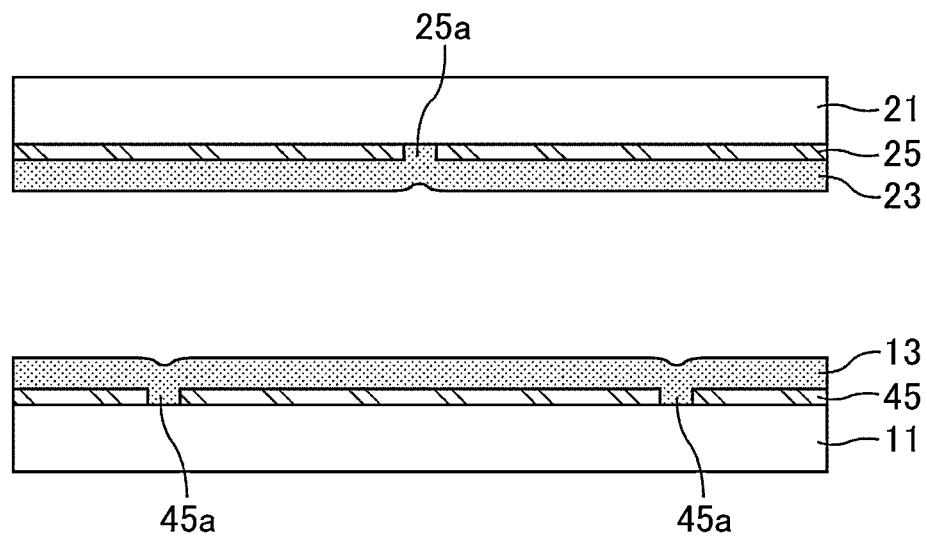
FIG. 10 is a cross-sectional view schematically illustrating an example in which the PVA mode is applied to a liquid crystal display device according to Embodiment 1 after a monomer polymerization process.

FIG. 10 is a cross-sectional view schematically illustrating an example in which the PVA mode is applied to a liquid crystal display device according to Embodiment 1 after a monomer polymerization process. In FIG. 10, the wirings, electrodes, color filters, and the like are not illustrated. As illustrated in FIG. 10, in Application Example 2, the electrodes 25 and 45 are formed on the pair of glass substrates 11 and 21, respectively. Moreover, the polymer layers 13 and 23 are formed on the entire surface of the substrate including the electrodes 25 and 45, positions of the electrodes exposed by slits 25a and 45a, and the like, thereby forming the interface with the liquid crystal layer. Since the polymer layers 13 and 23 according to Embodiment 1 have a high vertical alignment regulating force, satisfactory black display is obtained and display defects such as luminous dots and luminous lines are not easily generated.

Application Example 3

In Application Example 1, the example in which a wall-shaped (a linear shape in a plan view) rib is formed on the common electrode as the dielectric protrusion is described. However, a columnar (a point-like shape in a plan view) structure may be formed on the common electrode as the dielectric protrusion. Such a columnar (a point-like shape in a plan view) dielectric protrusion is also referred to as a rivet. In addition, a mode in which the rivet is provided as the alignment control protrusion to control the alignment of liquid crystal molecules is also referred to as the continuous pinwheel alignment (CPA) mode. In the CPA mode, it is not necessary that the pixel electrode be provided with a slit, and a hole may be formed on the common electrode instead of the rivet.

Figure 11:
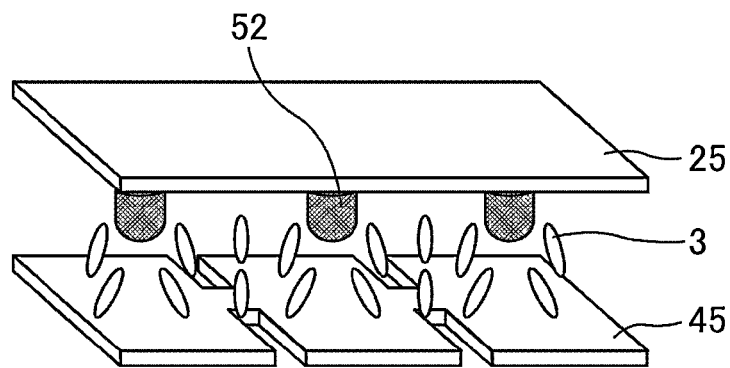
FIG. 11 is a perspective view schematically illustrating an example in which the CPA mode is applied to a liquid crystal display device according to Embodiment 1 when a voltage is not applied thereto.
Figure 12:
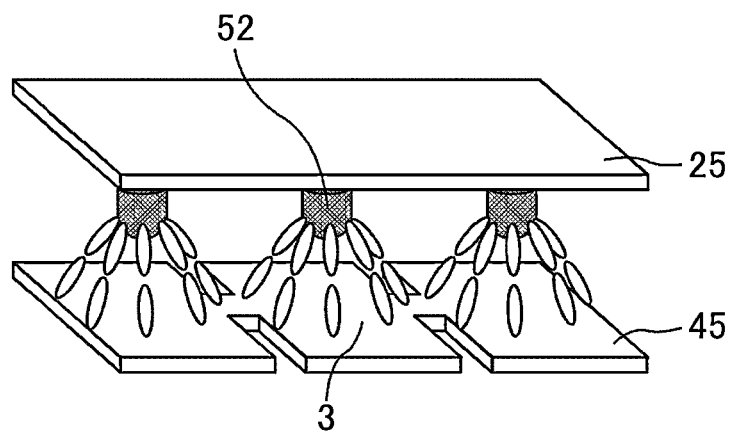
FIG. 12 is a perspective view schematically illustrating an example in which the CPA mode is applied to a liquid crystal display device according to Embodiment 1 when a voltage is applied thereto.

FIGS. 11 and 12 are perspective view schematically illustrating an example in which the CPA mode is applied to a liquid crystal display device according to Embodiment 1. FIG. 11 illustrates a case where a voltage is not applied, and FIG. 12 illustrates a case where a voltage is applied. In the CPA mode, regarding one substrate, a dielectric rivet 52 is formed on the electrode 25; and regarding the other substrate, a slit is not formed on the electrode 45. As illustrated in FIG. 11, when a voltage is not applied, almost all the liquid crystal molecules 3 other than a part of the liquid crystal molecules 3 adjacent to the rivet 52 are vertically aligned. However, as illustrated in FIG. 12, when a voltage is applied, the liquid crystal molecules 3 are radially aligned with respect to the rivet 52.

Figure 13:
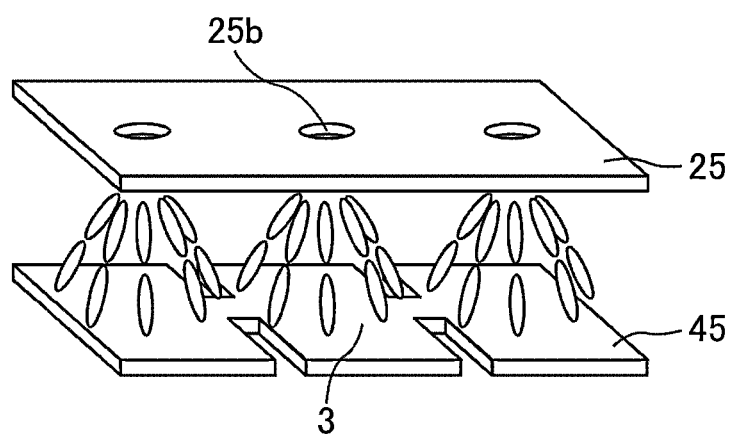
FIG. 13 is a perspective view schematically illustrating a modification example of an example in which the CPA mode is applied to a liquid crystal display device according to Embodiment 1.

FIG. 13 is a perspective view schematically illustrating a modification example of an example in which the CPA mode is applied to a liquid crystal display device according to Embodiment 1. The configuration of FIG. 13 is the same as that of FIG. 12, except that the hole 25b is formed instead of the rivet. FIG. 13 illustrates a case where a voltage is applied, and liquid crystal molecules are radially aligned with respect to the hole 25b as in the case of providing the rivet.

Figure 14:
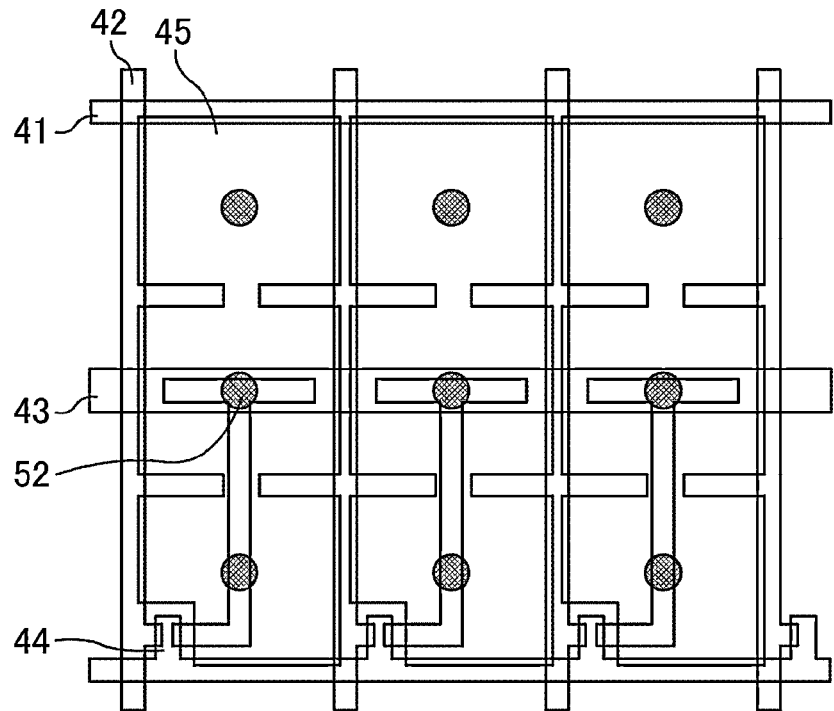
FIG. 14 is a plan view schematically illustrating an example in which the CPA mode is applied to a liquid crystal display device according to Embodiment 1.

FIG. 14 is a plan view schematically illustrating an example in which the CPA mode is applied to a liquid crystal display device according to Embodiment 1. As illustrated in FIG. 14, each rivet 52 has a point-like shape when seen in a plan view, and three rivets 52 are arranged in each pixel. Slits are formed on the pixel electrodes, and one pixel electrode is broadly divided into three regions. In addition, the rivets 52 are arranged at positions overlapping the centers of the respective divided three regions. It is preferable that the rivets 52 are provided at regular intervals from the viewpoint of reducing display unevenness, but a region in which a part of intervals are different may be present.

Figure 15:
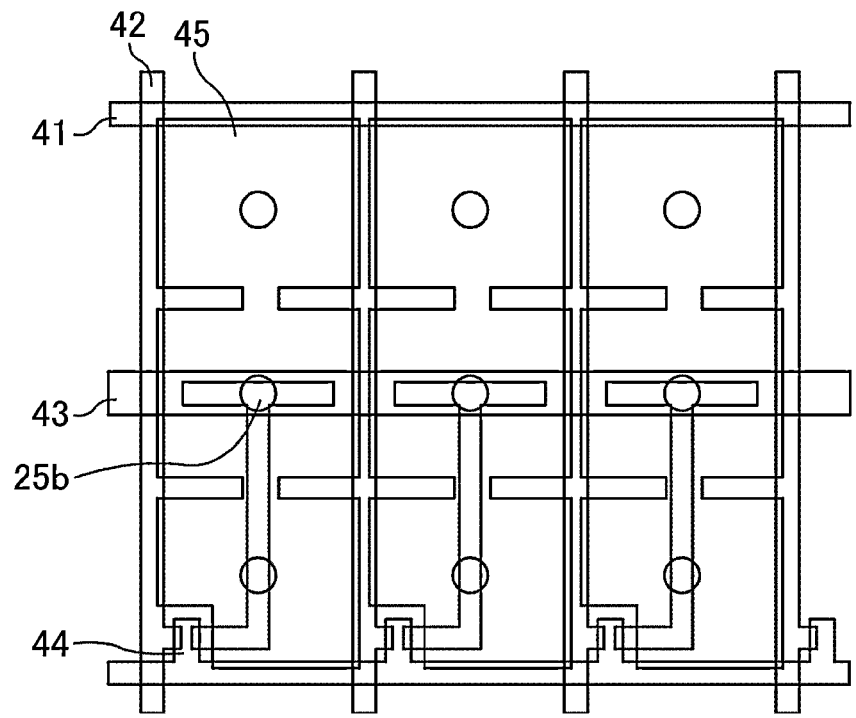
FIG. 15 is a plan view schematically illustrating a modification example of an example in which the CPA mode is applied to a liquid crystal display device according to Embodiment 1.

FIG. 15 is a plan view schematically illustrating a modification example of an example in which the CPA mode is applied to a liquid crystal display device according to Embodiment 1. The configuration of FIG. 15 is the same as that of FIG. 14, except that the hole 25b is formed instead of the rivet.

Figure 16:
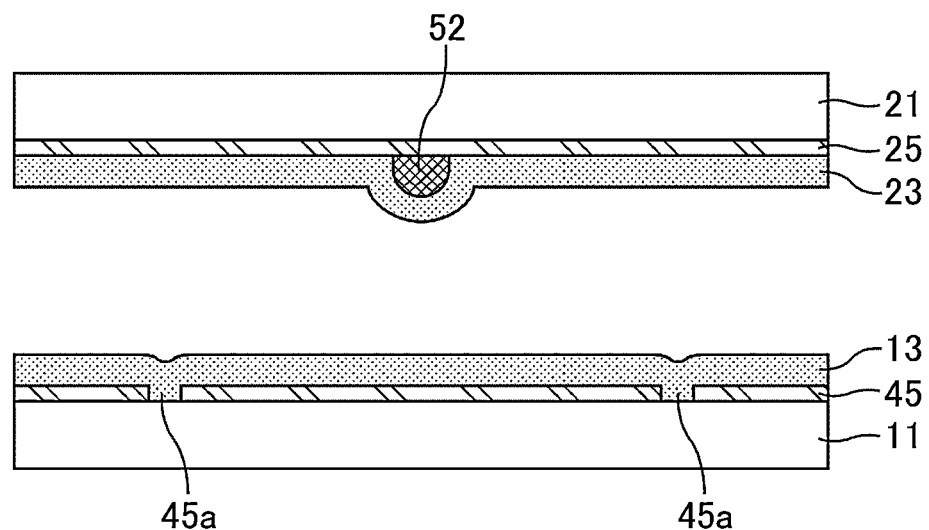
FIG. 16 is a cross-sectional view schematically illustrating an example in which the CPA mode is applied to a liquid crystal display device according to Embodiment 1 after a monomer polymerization process.

FIG. 16 is a cross-sectional view schematically illustrating an example in which the CPA mode is applied to a liquid crystal display device according to Embodiment 1 after a monomer polymerization process. In FIG. 16, the wirings, electrodes, color filters, and the like are not illustrated. As illustrated in FIG. 16, in Application Example 3, the electrodes are formed on the pair of glass substrates 11 and 21, respectively. Moreover, the polymer layers 13 and 23 are formed on the entire surface of the substrate including the electrodes, the rivet 52, and the like, thereby forming the interface with the liquid crystal layer. Since the polymer layers 13 and 23 according to Embodiment 1 have a high vertical alignment regulating force, satisfactory black display is obtained and display defects such as luminous dots and luminous lines are not easily generated.

Other components of the liquid crystal display device according to Embodiment 1 will be described in detail.

In the liquid crystal display device according to Embodiment 1, the array substrate, the liquid crystal layer, and the counter substrate are laminated in the stated order from a back surface side to an observation surface side of the liquid crystal display device. A polarizing plate is attached onto the back surface side of the array substrate. In addition, a polarizing plate is attached onto the observation surface side of the counter substrate. These polarizing plates may be provided with a retardation plate; and may be a circularly polarizing plate.

In the liquid crystal display device according to Embodiment 1, light emitted from a back light unit provided inside the liquid crystal display device or outside light may be used as display light. In the case of the back light unit, the backlight unit is provided on the further backward surface side from the array substrate such that light passes through the array substrate, the liquid crystal layer, and the counter substrate in the stated order. When outside light is used as display light, the array substrate is provided with a reflector for reflecting outside light. In addition, at least in a region in which reflected light is used as display light, it is necessary that the polarizing plate attached onto the counter substrate is a circularly polarizing plate including a so-called λ/4 retardation plate.

The type of the back light unit may be an edge light type or a direct type, but is not particularly limited. In a liquid crystal display device including a small-size screen, a small number of light sources are used and thus display can be performed with low power consumption; and an edge light type back light unit suitable for a thin device is widely used.

Examples of a light source which can be used in Embodiment 1 include a light emitting diode (LED) or a cold cathode fluorescent lamp (CCFL).

Examples of components of the back light unit include a reflecting sheet, a diffusion sheet, a prism sheet, and a light guide plate, in addition to the light source. In the edge light type back light unit, light emitted from the light source is incident on the light guide plate from the side surface of the light guide plate; is reflected and diffused to be emitted from a main surface of the light guide plate as surface light; and passes through the prism sheet and the like to be emitted as display light. In the direct type back light unit, light emitted from the light source directly passes through the reflecting sheet, the diffusion sheet, the prism sheet, and the like without passing through the light guide plate.

In the liquid crystal display device according to Embodiment 1, components of the polymer layers, components of monomers included in the polymer layers, and the like can be confirmed by dividing the respective components to collect the polymer layers and chemically analyzing the polymer layers by using $^{13}$C-nuclear magnetic resonance (NMR), mass spectrometry (MS), and the like.

Example 1

Hereinafter, an example in which the liquid crystal display device according to Embodiment 1 is prepared in the MVA mode will be described.

First, the pair of substrates including the array substrate and the counter substrate were prepared. The liquid crystal layer composition including the liquid crystal material and the monomer for forming a polymer layer was added dropwise thereto, followed by bonding with the other substrate. The color filters were prepared in the counter substrate.

On the counter substrate, a photosensitive acrylic resin material was patterned by using a photolithography method to form a linear rib on the common electrode. In addition, on the array substrate, a slit was formed on each pixel electrode in a photolithography process for patterning a pixel electrode corresponding to each pixel.

In Example 1, a compound represented by the following formula (6) was used as the monomer for forming a polymer layer.

[Chem. 8]

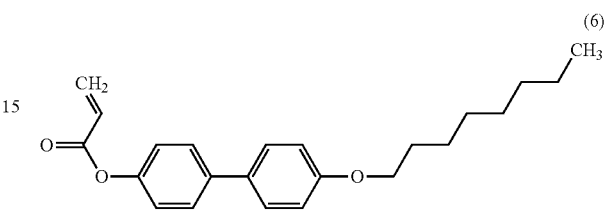

(6)

The compound represented by the above formula (6) contains a biphenyl group, a methacrylate group directly bonded to the biphenyl group, and an alkoxyl group having 8 carbon atoms directly bonded to the biphenyl group. In Example 1, the liquid crystal layer composition was prepared so as to contain 1 wt % of the monomer represented by the above formula (6).

Next, the liquid crystal layer that was held between the pair of substrates was irradiated with 3 J/cm$^2$ of ultraviolet light in a state where a voltage of 0 V was applied thereto from the array substrate side to perform polymerization. As a result, respective liquid crystal cells in which the polymer layers were formed on the substrates were completed. The irradiation time of ultraviolet light on the liquid crystal cells was 30 minutes.

Figure 17:
FIG. 17 is a diagram schematically illustrating the black display of a liquid crystal display device which is formed by using a polymer layer-forming technique according to the present invention.

When the prepared liquid crystal display panel, to which an polarizing plate was not attached, was observed by using a polarizing microscope in which polarizing axes intersected with each other at 90° C., black display in which luminous dots and luminous lines were not observed at all as illustrated in FIG. 17 was obtained.

Embodiment 2

The form of a liquid crystal display device according to Embodiment 2 is the same as that of Embodiment 1, except that a color filter on array (COA) structure is adopted in which the color filters are formed on the array substrate, not on the counter substrate.

Figure 18:
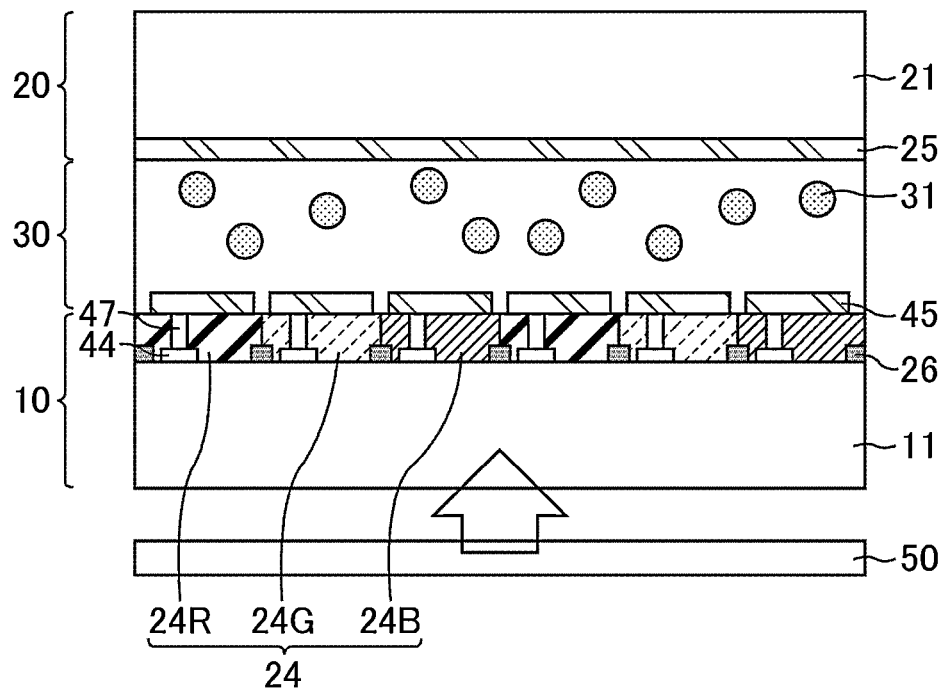
FIG. 18 is a cross-sectional view schematically illustrating a liquid crystal display device according to Embodiment 2 before a monomer polymerization process.
Figure 19:
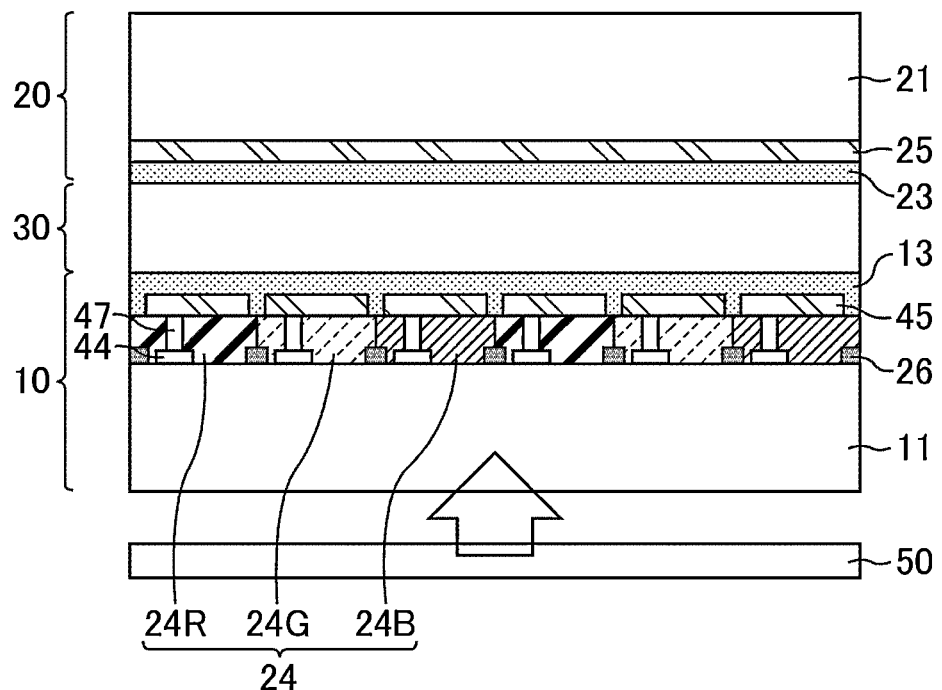
FIG. 19 is a cross-sectional view schematically illustrating a liquid crystal display device according to Embodiment 2 after a monomer polymerization process.
Figure 20:
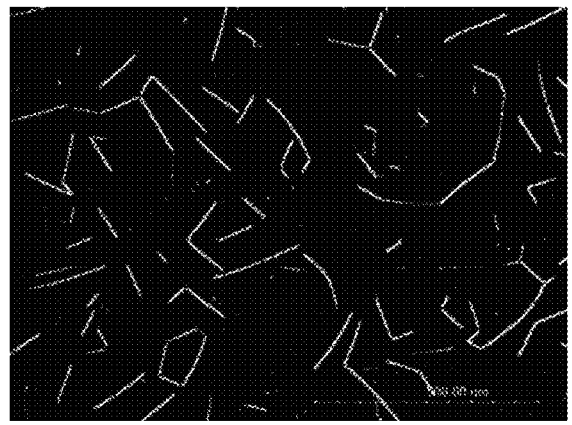
FIG. 20 is a schematic diagram illustrating the black display (first related-art example) of a liquid crystal display device which is formed by using a polymer layer-forming technique of the related art.
Figure 21:
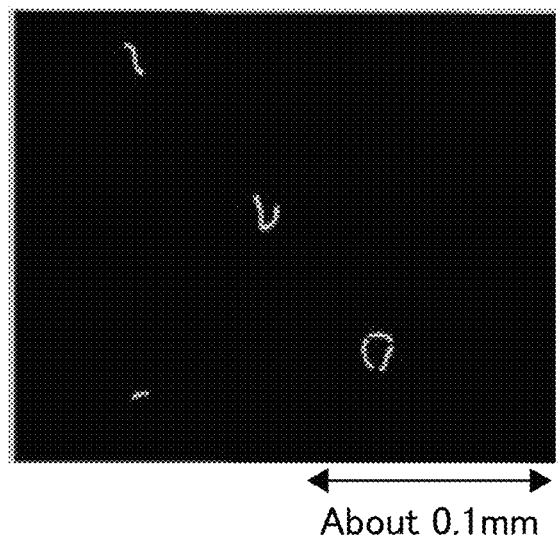
FIG. 21 is a schematic diagram illustrating the black display (second related-art example) of a liquid crystal display device which is formed by using a polymer layer-forming technique of the related art.
Figure 22:
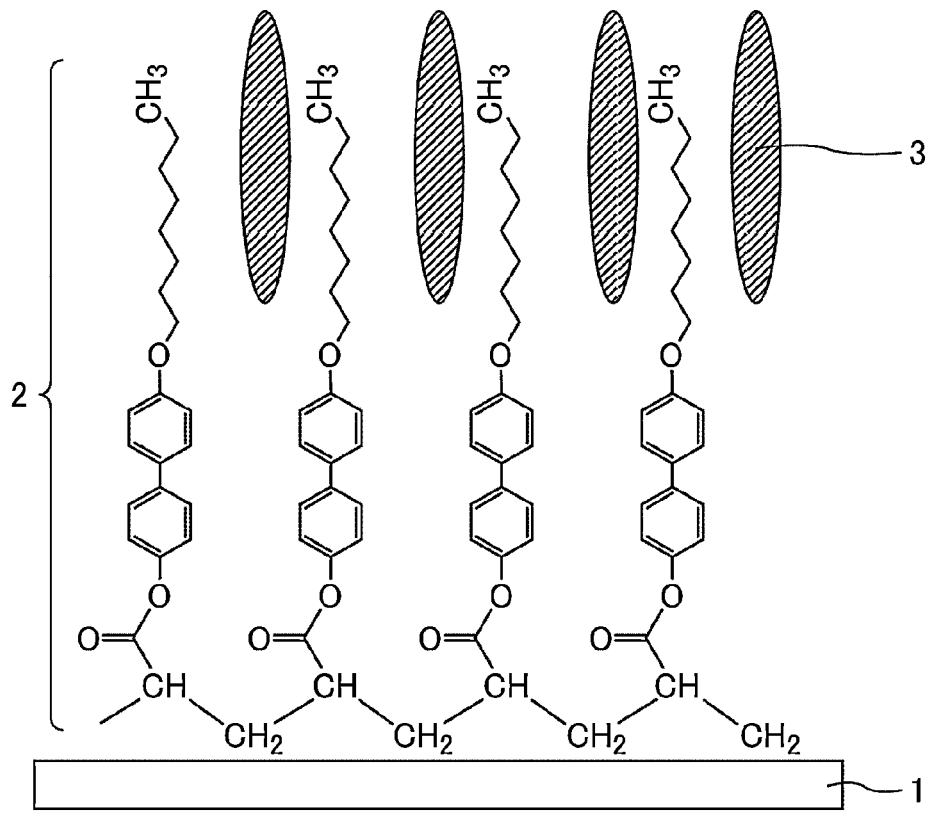
FIG. 22 is a diagram schematically illustrating the relationship between a side chain of a polymer layer and the alignment of liquid crystal molecules and, specifically, illustrating a structure of a polymer layer which is formed by using a monomer in which a functional group is bonded to the 4 position and an alkyl chain is bonded to the 4' position.
Figure 23:
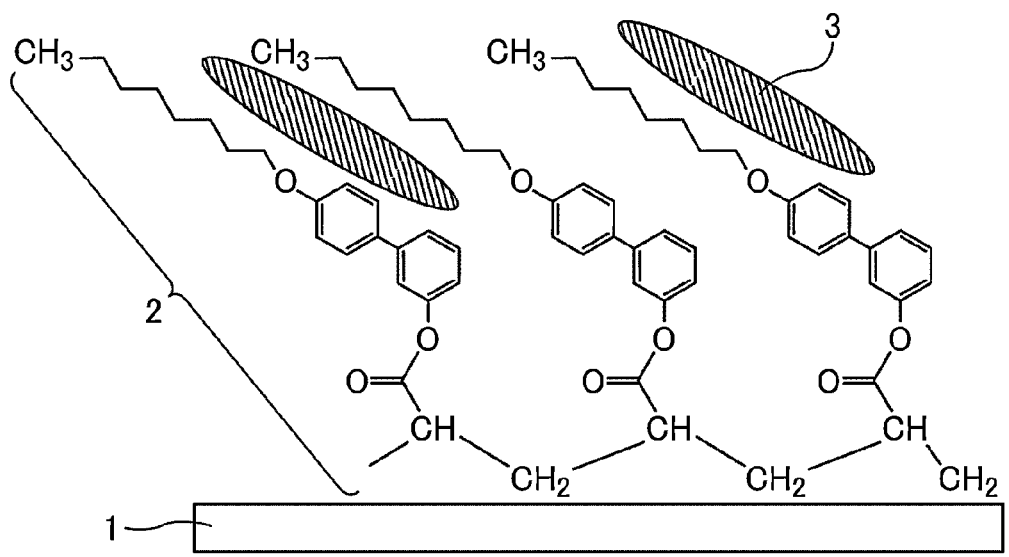
FIG. 23 is a diagram schematically illustrating the relationship between a side chain of a polymer layer and the alignment of liquid crystal molecules and, specifically, illustrating a structure of a polymer layer which is formed by using a monomer in which a functional group is bonded to the 3 position and an alkyl chain is bonded to the 4' position.
Figure 24:
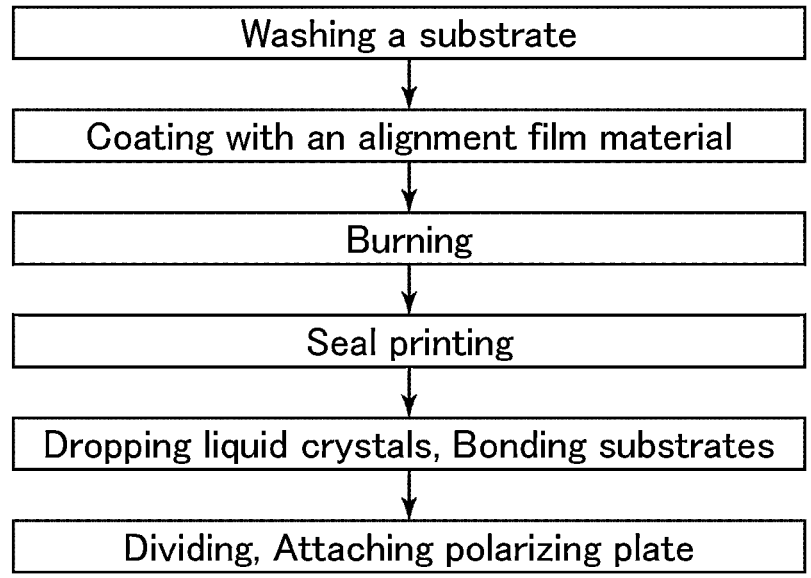
FIG. 24 is a flowchart illustrating an example of manufacturing processes of a general liquid crystal display device.
Figure 25:
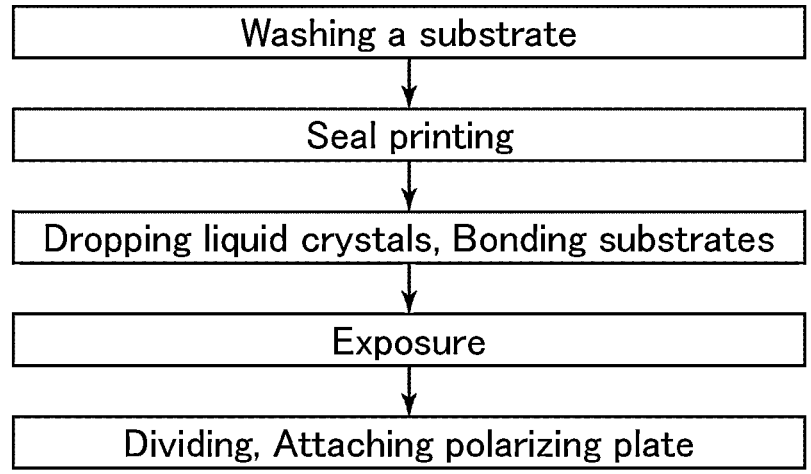
FIG. 25 is a flowchart illustrating an example of manufacturing processes of a liquid crystal display device according to the present invention.

FIGS. 18 and 19 are cross-sectional views schematically illustrating a liquid crystal display device according to Embodiment 2. FIG. 18 illustrates the liquid crystal display device before a monomer polymerization process, and FIG. 19 illustrates the liquid crystal display device after the monomer polymerization process. As illustrated in FIGS. 18 and 19, in Embodiment 2, the color filters 24 and the black matrixes 26 are formed on the array substrate 10. More specifically, the color filters 24 and the black matrixes 26 are arranged between the insulating transparent substrate 11 that is formed of glass or the like and the pixel electrodes 25. In addition, the TFTs 44 are formed between the transparent substrate 11 and the color filters 24. The pixel electrodes 25 and the TFTs 44 are connected through the contact portions 47 provided in the color filters 24. The liquid crystal display device according to Embodiment 2 does not substantially include an alignment film on the pixel electrodes 45. In addition, the liquid crystal display device according to Embodiment 2 does not substantially include an alignment film on the common electrode 25. That is, before the monomer polymerization process, the pixel electrodes 45 and the common electrode 25 are in direct contact with the liquid crystal layer 30; and after the monomer polymerization process, the polymer layers 13 and 23 are directly formed on the pixel electrodes 45 and the common electrode 25. In FIGS. 18 and 19, three color filters including the red filter 24R, the green filter 24G, and the blue filter 24B are used. However, the kind, number, and arrangement of color filters are not particularly limited as long as at least these three color filters are used. In addition, as necessary, the black matrixes may be provided on the counter substrate 20 side.

In the COA structure according to Embodiment 2, unlike Embodiment 1, it is preferable that the liquid crystal layer for forming a polymer layer is irradiated with light from the counter substrate side. As a result, the amount of light shielded by the color filters, the black matrixes, and the like can be reduced. Therefore, a high transmittance can be obtained and the polymerization rate can be improved. Furthermore, since a shadow caused by shielding the light is not formed, the possibility of alignment defects can be reduced.

According to the COA structure, an alignment deviation problem, which is caused by forming the pixel electrodes and the color filters on different substrates, respectively, can be solved.

The present application claims priority to Patent Application No. 2010-227892 filed in Japan on Oct. 7, 2010 under the Paris Convention and provisions of national law in a designated State, the entire contents of which are hereby incorporated by reference.

REFERENCE SIGNS LIST

1: substrate
2: side chain
3: liquid crystal molecules
10: array substrate
11, 21: insulating substrate
13, 23: polymer layer
14: insulating film
20: counter substrate
24: color filter
24R: red (R) color filter
24G: green (G) color filter
24B: blue (B) color filter
25: common electrode
25a: slit of common electrode
25b: hole of common electrode
26: black matrix
30: liquid crystal layer
31: monomer
41: gate signal line
42: source signal line
43: auxiliary capacitor (CS) wiring
44: TFT
45: pixel electrode
45a: slit of pixel electrode
47: contact portion
50: back light unit
51: rib (dielectric protrusion)
52: rivet (dielectric protrusion)

The invention claimed is:

1. A liquid crystal display device comprising:
a pair of substrates; and
a liquid crystal layer that is held between the pair of substrates,
wherein both substrates of the pair of substrates optionally include an alignment film,
at least one substrate of the pair of substrates includes a polymer layer that controls the alignment of liquid crystal molecules adjacent thereto,
the polymer layer is formed by polymerization of monomers of at least one kind included in a liquid crystal layer composition, and
the monomers of at least one kind contain a compound represented by the following formula (1):

[Chem. 1]

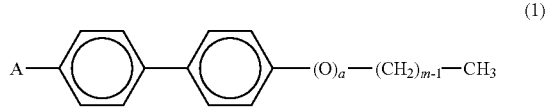

(wherein A represents an acrylate group, a methacrylate group, an ethacrylate group, a vinyl group, or an allyl group; a represents 0 or 1; and m represents a natural number of 4 to 12).

2. The liquid crystal display device according to claim 1, wherein the monomers of at least one kind further contain a bifunctional monomer, and
a molar ratio of the bifunctional monomer to the compound represented by the formula (1) is less than or equal to 0.1.

3. The liquid crystal display device according to claim 1, wherein the liquid crystal layer composition contains a polymerization initiator.

4. The liquid crystal display device according to claim 1, wherein both substrates of the pair of substrates include an electrode,
one substrate of the pair of substrates includes a wall-shaped dielectric protrusion on a liquid crystal layer side of the electrode, and
the electrode included in the other substrate of the pair of substrates includes a slit.

5. The liquid crystal display device according to claim 1, wherein both substrates of the pair of substrates include an electrode, and
all the electrodes include a slit.

6. The liquid crystal display device according to claim 1, wherein both substrates of the pair of substrates include an electrode, and
one substrate of the pair of substrates includes a columnar dielectric protrusion on a liquid crystal layer side of the electrode.

* * * * *